US005543000A

United States Patent [19]

Lique

[11] Patent Number: 5,543,000

[45] Date of Patent: Aug. 6, 1996

[54] METHOD OF FORMING RADIATING COAXIAL CABLE

[75] Inventor: Roger M. Lique, Jackson, Miss.

[73] Assignee: Trilogy Communications, Inc.,, Pearl, Miss.

[21] Appl. No.: 290,302

[22] Filed: Aug. 15, 1994

Related U.S. Application Data

[62] Division of Ser. No. 965,148, Oct. 22, 1992, Pat. No. 5,339,058.

[51] Int. Cl.$^{6}$ .......................... H01B 13/20; H01B 13/24; B32B 1/10; B32B 31/18

[52] U.S. Cl. ................................ 156/52; 156/50; 156/51; 156/244.12; 29/728; 29/825; 29/828; 83/875; 83/942; 83/947

[58] Field of Search ................................ 156/47, 51, 53, 156/52, 54, 56, 244.12; 174/28, 29, 30, 111, 126.3, 126.4, 102 SP; 333/237; 29/728, 729, 825, 828; 83/876, 875, 947, 942

[56] References Cited

U.S. PATENT DOCUMENTS

| | | | |
|---|---|---|---|
| 2,992,407 | 7/1961 | Slusher | 333/244 |
| 3,106,713 | 10/1963 | Murata, et al. | 343/770 |
| 3,417,400 | 12/1968 | Black | 343/771 |
| 3,660,589 | 5/1972 | Jachimowicz et al. | 174/28 |
| 3,941,913 | 3/1976 | Buschkamp | 156/56 X |
| 4,129,841 | 12/1978 | Hildebrand et al. | 333/237 |
| 4,280,225 | 7/1981 | Willis | 455/55.1 |
| 4,339,733 | 7/1982 | Smith | 333/237 |
| 4,502,686 | 3/1985 | Iiams, Jr. | 273/126 R |
| 4,800,351 | 1/1989 | Rampalli et al. | 333/237 |

FOREIGN PATENT DOCUMENTS

| | | |
|---|---|---|
| 1079504 | 10/1978 | Canada . |
| 2022990 | 12/1971 | Germany . |

*Primary Examiner*—Michael W. Ball
*Assistant Examiner*—Francis J. Lorin
*Attorney, Agent, or Firm*—Pennie & Edmonds

[57] ABSTRACT

A radiating cable comprises a core having a center conductor bonded to, centered in, and supported by discs of dielectric material. A sleeve of dielectric material is extruded over the discs and thereby bonded thereto to form a plurality of sealed, coaxial, dielectric chambers. A tubular outer conductor is bonded in concentric relation to the sleeve. In a continuous process, at least one slot is formed in the outer conductor by a cutting operation and an outer jacket is extruded over the outer conductor. In a preferred embodiment, the outer conductor is made of an aluminum tube and two circumferentially equally spaced slots are formed therein by removing between 10 and 35% of the aluminum material. The width of the resulting slots may be configured so that a joint is formed in the slot between the insulating sleeve and the outer jacket, thus obviating the use of adhesive in bonding the outer jacket to the cable.

17 Claims, 3 Drawing Sheets

METHOD OF FORMING RADIATING COAXIAL CABLE

This is a divisional of application Ser. No. 07/965,148, filed Oct. 22, 1992, now U.S. Pat. No. 5,339,058.

BACKGROUND OF THE INVENTION

The present invention relates to a coaxial transmission line or cable capable of radiating as well as transmitting high frequency electromagnetic energy.

Cables radiating high frequency are beneficially employed as a distributed source or receiver of signals wherever communications in the radio bandwidth are inhibited by structural obstructions. Common installation sites therefore include within or around buildings, garages, tunnels, as well as in areas where communications are otherwise unobstructed but where precisely controlled signal levels must be distributed over a distance without interfering with other nearby signals.

In its simplest form, a coaxial cable is comprised of an inner conductor, an outer conductor concentrically arranged about the inner conductor, and a dielectric layer interposed between the two conductors. In a non-radiating coaxial cable, the outer conductor is of sufficient thickness and conductivity to attenuate the normally incident electric field, thereby permitting the transmission of a signal with a minimum of signal ingress or egress.

To the extent that signal leakage through the outer conductor can not be totally eliminated, all coaxial transmission lines are radiating to some extent. In radiating coaxial cables, however, the coaxial cable acts as an antenna and radiates a portion of the transmitted signal over its entire length or over a defined part of the cable. These radiated signals are useful for transmitting radio frequency signals to, for example, a mobile receiver.

The signal level found at a point external to and at a specific distance from the radiating cable should be at a predictable ratio with the level maintained within the cable. This ratio is known as the coupling loss and is usually expressed in logarithmic scale (dB). Because the coupling phenomenon results from the voltage level found in the cable coupling to an external potential, the line attenuation of the radiating cable will vary depending on the environment of installation and the weather conditions associated therewith. This is particularly true where the cable is affixed directly to the ground or is in contact with other lossy planes.

Although signal leakage is required for the radiating cable to function, it remains necessary that the cable retain most of its signal transmission characteristics. It has been observed that in order to obtain the desired radiation intensity, the apertures in the outer conductor must be very large. The effect of large apertures, however, is to increase the resistance per axial length of the cable. Correspondingly, the attenuation (measured in Db/100 ft) of the internal TEM signal is also increased. It is well known that such elevated levels of attenuation place severe limitations on the distance that unamplified signals can be transmitted along the cable.

The provision of apertures in the outer conductor affects the mechanical properties of the cable as well. Compared to a solid metal sheath, the apertured conductor is less resistant to kinking and crushing during handling and installation of the cable. Further, the ability to withstand environmental conditions, specifically moisture ingress into the dielectric core, is reduced. Each of these problems may lead to electrical degradation of the cable.

German printed application No. 2,022,990 discloses a high-frequency cable in which the outer conductor is constructed by winding a ribbon or a wire-like material around a continuous, cylindrical dielectric spacer, which in turn concentrically surrounds the central conductor. High frequency energy radiates through the resulting gaps or openings in the outer conductor. A jacket of conventional insulating material is placed over the outer conductor. This cable configuration, while relatively inexpensive to manufacture, is heavy and subject to immediate moisture ingress through the turns of the helical outer conductor when the outer jacket is damaged.

U.S. Pat. No. 4,129,841 discloses a radiating coaxial cable which in addition to a conventional central conductor, insulating spacer, and outer conductor, further includes a plurality of cylindrical radiating elements which are individually placed and distributed along the extension of the cable but in uniformly spaced apart relation to one another. A thin insulating envelope is provided between the radiating elements and the outer conductor. Although this arrangement allows for uniform distribution of the outer field over the entire extension of the cable, it is heavy, difficult to install, and relatively expensive to manufacture.

U.S. Pat. No. 4,339,733 discloses a radiating cable which includes a center conductor surrounded by a dielectric core and a plurality of radiating sheaths disposed along the length of the dielectric core so as to be coaxial with the central, longitudinal axis of the cable. In addition to decreasing attenuation, the provision of additional sheaths reduces moisture ingression due to the fact that the additional layers of radiating sheaths and dielectrics constitute additional barriers to water penetration. However, the formation and integration of plural sheaths into the cable design requires additional material and manufacturing steps, thus increasing both the weight of the cable and the costs of production.

SUMMARY OF THE INVENTION

In view of these and other disadvantages in existing radiating cables, it is an object of the present invention to provide an improved radiating cable which minimizes degrading environmental effects on the performance of the cable and which significantly limits attenuation along the transmission line.

Still another object of the invention is to decrease the problem of moisture ingression in the radiating cable.

Yet another object of the invention is to provide a radiating cable which can be made in a simple and economical manner while utilizing conventional cable producing equipment.

These and other objects and advantages are achieved by an improved radiating cable comprised of at least one central conductor, a plurality of coaxial dielectric members arranged along the central conductor, and a dielectric sleeve concentrically arranged around the plurality of dielectric members and in sealing engagement therewith. A radiating sheath of conductive metal surrounds the dielectric sleeve and is itself surrounded by a protective insulating jacket. Any of the various known materials for constructing center conductors may be employed, such as copper, aluminum, and copper clad aluminum, etc.

The dielectric core, comprised of the dielectric members and the sleeve, defines a plurality of coaxial dielectric air chambers which surround the center conductor and separate it from the coaxial radiating sheath. The materials used in constructing the dielectric members and sleeve may be a polymer material such as polytetrafluorethylene or polyethylene (foamed or unfoamed), laminates, or any other material or combination of materials conventionally employed as dielectrics in coaxial cables.

The sleeve provides additional protection against moisture ingress, such as in cases where the outer insulating jacket of the cable is damaged. Further, the sleeve alleviates the susceptibility to kinking and crushing of the cable caused by the presence of apertures in the sheath. The dielectric members have a substantially circular cross section and each one preferably defines a central aperture for receiving and supporting the central conductor.

The radiating sheath is preferably tubular in shape and is positioned so as to be coaxial with the central longitudinal axis of the cable. The sheath may be constructed of any conventional material used as outer conductors in coaxial cables, preferably metals such as aluminum or copper or metal laminates, having apertures or other means to permit radiation. The sheaths may be in the form of helically or longitudinally wrapped structures such as tapes, ribbon, or wire, or tubular structures. The apertures may be simply holes or gaps in the sheath. Preferably, however, the sheath is tubular in form and two longitudinal gaps are formed therein, these being radially spaced from each other by 180° in order to produce a symmetrical arrangement, and thereby provide a more evenly distributed field emission. It is also preferred that the sheath be adhesively bonded to the dielectric sleeve using an adhesive bonding agent such as an ethylene-acrylic acid copolymer cement. Although the insulating jacket may also be adhesively bonded to the sheath, it is preferred that the jacket be directly extruded onto the sheath at a temperature high enough to form a bond with the dielectric sleeve material exposed by the slots, so that no bonding agent is required.

The cable is encased in a protective outer jacket comprised of materials which are well known in the art. If desired, strengthening members, drain wires, and inductance elements may be included in the cable.

The thicknesses of the various layers, as well as the dimensions of the apertures or longitudinal slots in the sheath are not critical and may be selected to achieve desired performance characteristics. Hence, the exemplary and preferred thicknesses recited herein should not be construed to limit the scope of the invention.

In preparing the cable of the invention, the center conductor is centrally positioned within the dielectric members and bonded thereto. The dielectric members may be molded or extruded directly onto the cable or they may be molded in advance and subsequently positioned thereon. The insulating sleeve is then extruded, taped, wound, or applied in any other known manner over them, thereby defining the coaxial dielectric air chambers. Where the sleeve is extruded over the dielectric members, the heat of the extrusion process causes a melt bond therebetween to produce a one-piece dielectric. An adhesive may be used to bond other forms of the sleeve to the dielectric members. An adhesive bonding agent is applied to the surface of the insulating sleeve and the radiating sheath is then drawn, helically wound, longitudinally pulled (cigarette wrapped), braided, extruded, plated, or applied in any other known manner over the insulating sleeve. Where the radiating sheath is provided in a substantially solid, tubular form, one or more longitudinal slots are formed therein by removing selected amounts of sheath material. This removal process may be performed by pulling the cable past one or more routers, saw, or other conventional cutting means. Preferably, the cable is fed between a pair of spaced saws or routers and a pair of circumferentially spaced, longitudinal slots are simultaneously formed during the removal process. Once the slots have been formed and any waste material is removed therefrom, a protective outer jacket of insulating material is applied to the sheath by extrusion, taping, or any other conventional process. Depending upon the size of the gaps, slots, or apertures in the sheath, it may be necessary to apply a bonding agent to the surface of the sheath. Preferably, however, enough of the outer conductor is removed so that sufficient extruded jacket material at high temperature contacts the surface of the insulating sleeve and forms a durable bond therewith.

DETAILED DESCRIPTION OF THE INVENTION

Figure 1:
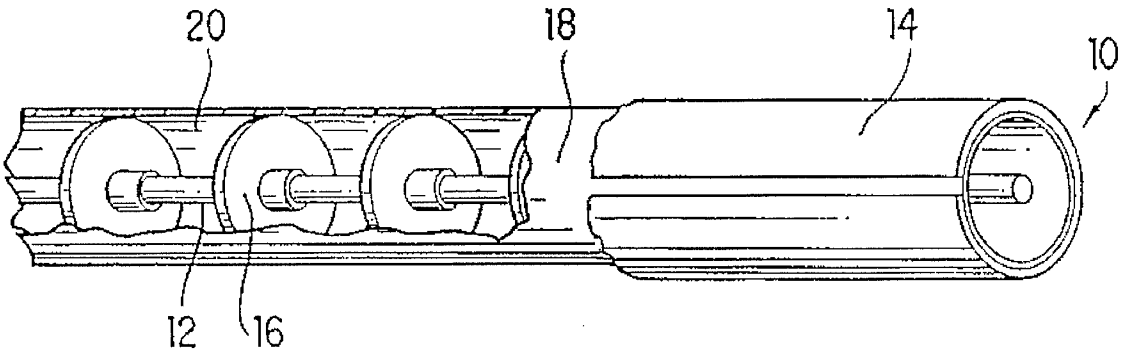
FIG. 1 is a partially broken away side perspective view illustrating a radiating coaxial cable constructed in accordance with the present invention.

As best shown in FIG. 1, the coaxial conductor system 10 of the present invention comprises a center conductor 12 surrounded concentrically by a tubular outer conductor 14. As will be discussed more fully below, dielectric insulation is provided between the conductors.

The center conductor 12 may be comprised of any electrically conducting material such as copper or aluminum, and may be provided in stranded wire or tubular form. Preferably, however, the center conductor is a copper-clad aluminum wire.

Concentrically disposed at axial intervals about center conductor 12 are a plurality of spacers 16 formed of a dielectric material. Each spacer 16 has a circular cross section and defines an axial hole therethrough for receiving and supporting center conductor 12. Preferably, the spacers 16 are constructed as discs. However, if desired a cylindrical member or a toroidal member with a disc insert may also be employed. The spacers 16 may be bonded to the central conductor using a conventional adhesive to prevent relative movement therebetween. For this purpose, an adhesive bonding agent such as an ethylene-acrylic acid copolymer cement may be used.

After the spacers 16 have been properly positioned on the central conductor 12, an insulating sleeve 18 is then extruded, taped, wound, or applied in any other known manner over them in sealing and bonded engagement therewith, thereby defining a plurality of coaxial dielectric air chambers 20 and an integral dielectric assembly. Sleeve 18 is preferably formed from the same material as that used in the spacers and forms a supporting surface for the radiating outer conductor 14. The materials used in constructing the spacers 16 and sleeve 18 may be a polymer material such as polytetrafluorethylene or polyethylene (foamed or unfoamed), laminates, or any other material or combination of materials conventionally employed as dielectrics in coaxial cables. Where required, fire retardant materials may be employed alone or in combination with other dielectric materials. For reasons of structural reliability and integrity, it is preferred that they be formed of unfoamed polyethylene. The sleeve provides additional protection against moisture ingress, such as in cases where the outer insulating jacket of the cable is damaged.

Once insulating sleeve 18 has been extruded or otherwise formed over the discs, an adhesive bonding agent is applied thereto and a radiating outer conductor 14 is then drawn, helically wound, longitudinally pulled (cigarette wrapped), braided, extruded, plated, or applied in any other known manner thereover. Outer conductor 14 is positioned in concentric relation over insulating sleeve 18 and may be formed in a variety of ways. For example, outer conductor 14 may be constructed as metal ribbon or wire helically wrapped around sleeve 18, thereby forming radiating gaps between adjacent coils. Alternatively, the outer conductor 14 may be formed as a unitary, solid tube drawn longitudinally over sleeve 18. In the preferred embodiment, the outer conductor 14 begins as a strip which is formed and welded into a tubular configuration which is then drawn over the sleeve in a continuous process.

Figure 2:
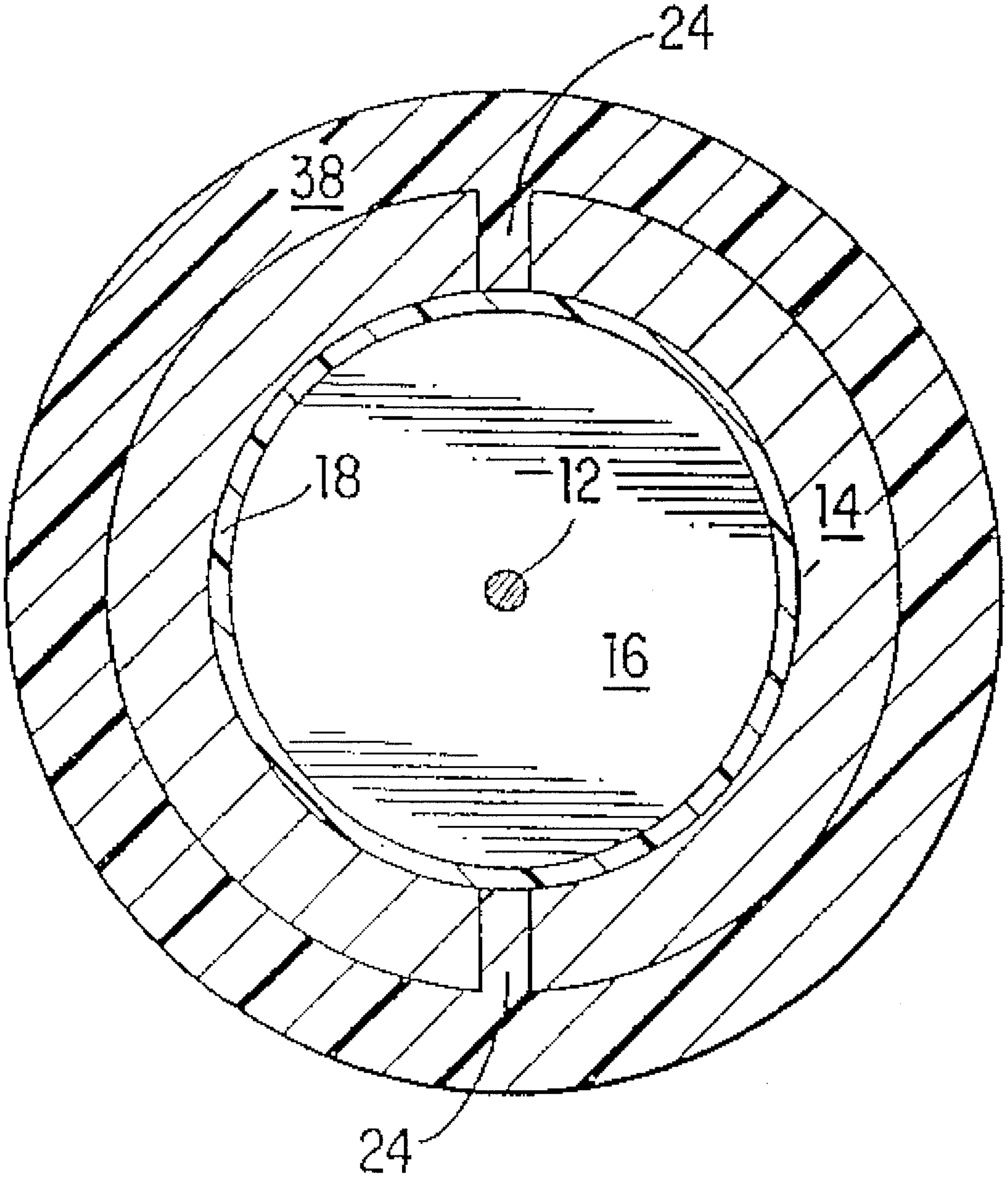
FIG. 2 is a cross sectional view of a radiating coaxial cable constructed in accordance with the present invention.

Although the tubular outer conductor 14 of the preferred embodiment may be constructed of any metal or metal alloy which exhibits suitable conducting properties, aluminum is preferred for its ductility and other metal working properties. To achieve a radiating configuration, one or more longitudinal slots 24 are formed in the outer conductor 14. As best shown in FIG. 2, slots 24 are preferably evenly spaced about the circumference of the cable 10. In the preferred embodiment illustrated in FIG. 2, two slots spaced at 180° are provided. However, it should be understood by those of ordinary skill in the art that additional slots may be employed and that the spacing of the slots need not be uniform.

The slots 24 may be formed in the cable of the preferred embodiment by any conventional process. Preferably, high accuracy complementary cutting means cut through the tubular conductor 14 to expose but not cut into the insulating sleeve 18. It is important that the cutting means be precisely controlled so that all metal, including splinters, is removed down to the sleeve while the sleeve itself remains intact. It has been found that removing between 10 and 35% of the aluminum used in constructing the slots provides tolerable attenuation and coupling. The best results have been obtained with approximately 20% of the aluminum removed.

Once the slots have been formed, a suitable outer jacket 38 is extruded over the outer sheath 14, thereby filling the radiating slots 24. The heat of the extruded jacket material causes the compound within radiating slots 24 to bond to the dielectric sleeve 18. This bonding resists any significant changes in slot width and minimizes the risk of kinking. Further, the bonding of jacket 38 and aluminum sheath 14 to the dielectric sleeve 18 produces a one-piece design which is strong and flexible. This design also provides maximum protection against moisture ingress because even if jacket 38 is damaged, the air dielectric chambers 20 remain enclosed by sleeve 18.

To further illustrate the advantages of the cable of the invention, the following examples are provided.

EXAMPLE I

To evaluate the attenuation of the energy transmitted within radiating cables prepared in accordance with the present invention, a coaxial radiating cable and a coaxial non-radiating cable were prepared as follows:

Cable A was manufactured by bonding discs of non-foamed polyethylene to a 0.188 in. diameter copper clad aluminum center conductor. The discs were spaced apart 1.21 in. from center to center and were adhesively bonded to the center conductor. Non-foamed polyethylene was then extruded over the discs to form a 0.035 in thick, 0.470 in. outer diameter insulating sleeve. A 0.020 in. thick, welded aluminum sheath having an outer diameter of 0.510 in. was drawn over the insulating layer and bonded thereto to form the outer conductor. Two 0.144" in wide slots were cut continuously through the sheath, 180° apart to provide uniform leakage regardless of the angular position. Approximately 20% of the aluminum was removed from the outer conductor during the slot cutting step to produce the radiating sheath. A medium density polyethylene jacket was extruded over the radiating sheath and into the slots.

Cable B was manufactured as a control. This non-radiating coaxial cable was prepared in the same manner as Cable A except that no longitudinal slots were formed in the outer conductor.

The samples were mounted about 0.5" away from and along a concrete wall using non-metallic hangers. Coupling loss measurements were performed on cable A. From a 20 foot distance, Cable A provided a coupling loss of approximately 62 dB at 100 MHz, 70 dB at 500 MHz, and 74 dB at 1 GHz. Swept frequency measurements from 5 to 1000 Mhz were also performed. The results are tabulated in Table I:

TABLE 1

| | Attenuation of Slotted vs. Unslotted | |
|---|---|---|
| | @ 68° F. | |
| Frequency (MHz) | Slotted (dB/100 ft) | Unslotted (dB/100 ft) |
| 5 | 0.23 | 0.02 |
| 30 | 0.38 | 0.25 |
| 150 | 1.01 | 0.76 |
| 300 | 1.52 | 1.14 |
| 450 | 1.94 | 1.45 |
| 600 | 2.37 | 1.72 |
| 750 | 2.77 | 1.98 |
| 900 | 3.33 | 2.19 |
| 1000 | 3.66 | 2.34 |

These results show that the absolute difference in attenuation between a radiating cable constructed in accordance with the present invention and a substantially identical non-radiating cable increases with frequency. It will of course be understood that the test conditions were intended only to simulate a typical installation, and that the attenuation performance of the radiating cable will vary in other installation environments.

In a preferred method for preparing the cable of the invention, the center conductor 12 is centrally positioned within the spacers 16. The spacers may be molded or extruded directly onto center conductor 12 or they may be molded in advance and subsequently positioned thereon. The insulating sleeve 18 is then extruded over them such that the heat of the extrusion process produces a heat bond therebetween.

Figure 3:
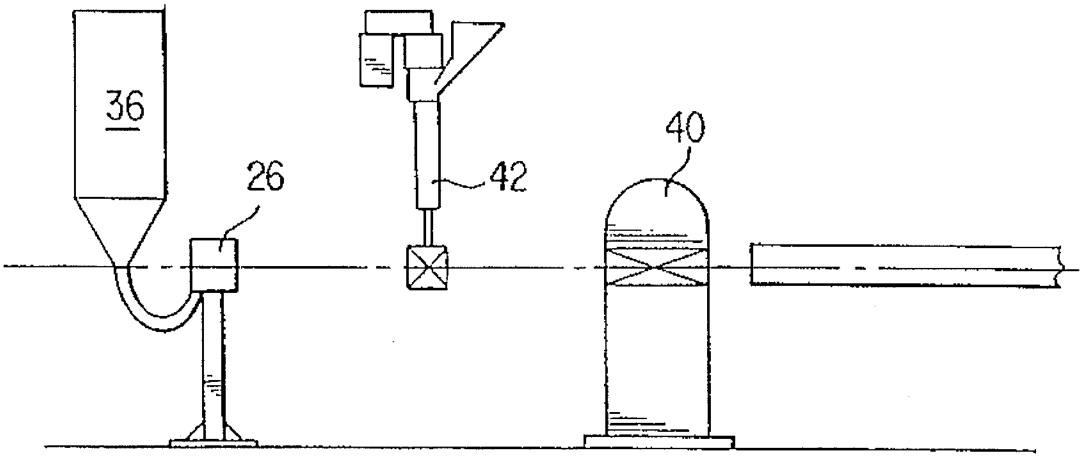
FIG. 3 is a graphical illustration of a production line adapted for use in making the radiating coaxial cable of the present invention.
Figure 4:
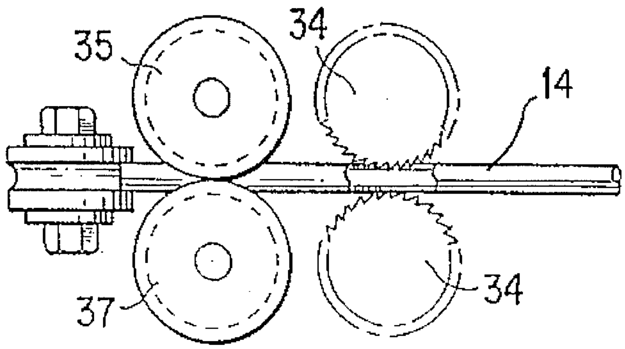
FIG. 4 is a plan view of one stage of the production line illustrated in FIG. 3.
Figure 5:
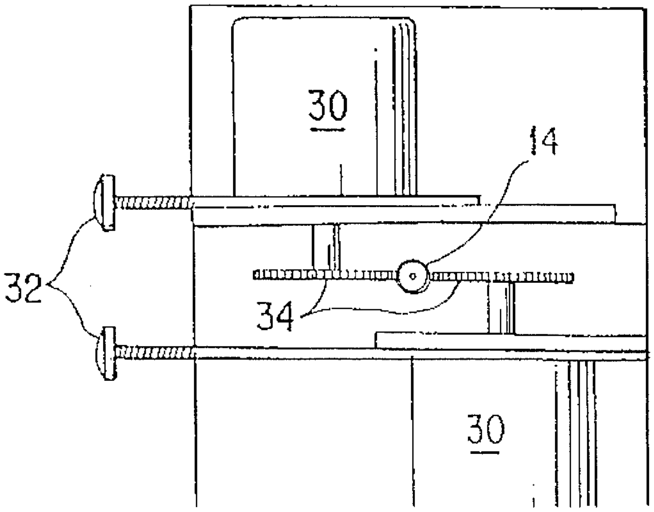
FIG. 5 is an end view of the production stage illustrated in FIG. 4.

An adhesive bonding agent is applied to the surface of the insulating sleeve 18 and a tubular outer conductor 14, preferably made of aluminum, is formed, welded, and drawn over the insulating sleeve 18. As shown in FIGS. 3–5, one or more longitudinal slots 24 are formed in outer conductor 14 by removing selected amounts of conductor material.

As illustrated in FIGS. 3–5, two circumferentially spaced, longitudinal slots 24 are preferably simultaneously formed by continuously pulling the cable between two precisely positioned, rotary cutting means 26 such as rotating saws or routers 30. The cutting means preferably includes adjustment means 32 for precisely controlling the position of the cutting blades 34, thus ensuring that only the conductor material is removed and protecting insulating sleeve 18 underneath. Where short lengths of cable are required, it will be apparent that the cable may be held stationary and the cutting means may be adapted to move therealong. When the outer conductor 14 is made of aluminum, the removal step removes between 10 and 35% of the aluminum therefrom.

As shown in FIG. 3, once the slots 24 have been formed, any waste material is removed therefrom by suction means 36 and a protective outer jacket 38 of insulating material is applied to conductor 14. Although the outer jacket 38 may be applied using any conventional process, it is preferably applied by an extruding means 40 immediately after the slot forming step. It is therefore preferred that the slot and jacket forming steps be performed in a continuous process on the same production line so that the cable passes between the cutting means and is then fed through a means for extruding the jacket. Depending upon the size of the slots 24 formed in the outer conductor 14, it may be necessary to apply a bonding agent to the surface of the conductor 14 prior to the extrusion step. As indicated in FIG. 3, the adhesive may be applied by extrusion via an extruding means 42 after the slots have been formed. Preferably, however, enough of the outer conductor is removed during the formation of the slots that sufficient extruded jacket material at high temperature contacts the surface of the insulating sleeve and forms a durable bond therewith. It has been found that for most applications, a slot width of at least 0.100" will provide sufficient contact area to permit bonding. However, the actual slot dimensions will depend upon the thermal characteristics and viscosity of the jacket material actually used.

The invention is not limited to the embodiments described above but all changes and modifications thereof not constituting departures from the spirit and scope of the invention are intended to be included. It is, therefore, intended that the scope be limited solely by the scope of the following claims.

What is claimed is:

1. A method of forming a radiating coaxial cable comprising the steps of:
   - providing a central conductor;
   - forming a plurality of coaxial dielectric air chambers by attaching a plurality of insulting spaced spacers to said central conductor;
   - forming a radiation sheath concentrically disposed over said spacers;
   - forming at least a pair of continuous slots or gaps along the length of said radiation sheath;
   - forming an outer insulating sleeve over said radiating sheath to cover said radiation sheath and said slots or gaps.

2. A method of forming a radiating coaxial cable according to claim 1, further comprising the step of forming an inner insulating sleeve between said spacer members and said radiation sheath, wherein said insulating spacer members are substantially circular.

3. A method of forming a radiating coaxial cable according to claim 2, wherein said inner insulating sleeve is formed by an extrusion process.

4. A method of forming a radiating coaxial cable according to claim 3, further comprising the step of applying an adhesive bonding agent to at least a portion of the exterior surface of said inner insulating sleeve.

5. A method of forming a radiating coaxial cable according to claim 4, wherein said radiation sheath is tubular conductor formed from a strip of conductive material, wherein said tubular conductor is drawn over said inner insulating sleeve.

6. A method of forming a radiating coaxial cable according to claim 5, wherein said outer insulating sleeve is formed by extruding a dielectric material over said radiation sheath.

7. A method of forming a radiating coaxial cable according to claim 6, further comprising the step of applying a bonding agent to at least a portion of said radiation sheath prior to said extruding step.

8. A method of forming a radiating coaxial cable according to claim 1, wherein said radiation sheath is an aluminum tube, further comprising the step of removing about 10 to 35 percent of said aluminum during formation of said slots or gaps.

9. A method of forming a radiating coaxial cable according to claim 8, wherein said pair of slots are spaced apart by 180°.

10. A method of forming a radiating coaxial cable according to claim 1, wherein said radiation sheath is an aluminum tube, further comprising the step of removing about 20 percent of said aluminum during formation of said slots or gaps.

11. A method of forming a radiating coaxial cable according to claim 10, wherein said pair of slots are spaced apart by 180°.

12. A method of forming a radiating coaxial cable according to claim 1, wherein said pair of slots are spaced apart by 108°.

13. A method of forming a radiating coaxial cable comprising the steps of:
   - providing a central conductor;
   - forming a plurality of coaxial dielectric air chambers by attaching a plurality of insulating spaced spacers to said central conductor;
   - forming a radiation sheath concentrically disposed over said spaces;
   - forming at least a pair of continuous slots or gaps along the length thereof;
   - forming an outer insulating sleeve over said radiating sheath to cover said radiation sheath and said slots or gaps;
   - forming an inner insulating sleeve between said spacer members and said radiating sheath, wherein said insulating spacer members are substantially circular, and wherein said inner insulating sleeve is formed by an extrusion process;
   - applying an adhesive bonding agent to at least a portion of the exterior surface of said inner insulating sleeve;
   - wherein said radiation sheath formed from a strip of conductive material, and wherein said radiation sheath is drawn over said inner insulating sleeve, and wherein said slots or gaps are formed by cutting through said radiation sheath.

14. A method of forming a radiating coaxial cable according to claim 13, further comprising the step of applying suction to said longitudinal slot during the cutting step to remove any loose material.

15. A method of forming a radiating coaxial cable according to claim 13, wherein said gaps or slots are formed by cutting said radiation sheath using at least one saw.

16. A method of forming a radiating coaxial cable according to claim 13, wherein said gap or slot is formed by cutting said radiation sheath using at least one router.

17. A method of forming a radiating coaxial cable comprising the steps of:

providing a central conductor;

forming a plurality of coaxial dielectric air chambers by attaching a plurality of insulating spaced spacers to said central conductor;

forming a radiation sheath concentrically disposed over said spacers;

forming at least a pair of continuous slots or gaps along the length thereof;

forming an outer insulating sleeve over said radiating sheath to cover said radiation sheath and said slots or gaps;

forming an inner insulating sleeve between said spacer members and said radiating sheath, wherein said insulating spacer members are substantially circular, and wherein said inner insulating sleeve is formed by an extrusion process, and wherein said at least two continuous gaps or slots are simultaneously formed by cutting said radiation sheath.

* * * * *